United States Patent
Peirce et al.

(10) Patent No.: US 6,332,126 B1
(45) Date of Patent: *Dec. 18, 2001

(54) SYSTEM AND METHOD FOR A TARGETED PAYMENT SYSTEM DISCOUNT PROGRAM

(75) Inventors: Roger L. Peirce, Los Altos; Bruce C. Rhoads, Foster City, both of CA (US); John Duncan, Malverne, NY (US); Scott J. Loftesness, Menlo Park, CA (US); Kurt W. Johnson, Tempe, AZ (US); Mary K. Dobbs, San Francisco, CA (US); Dan Mayes, Hanover Park, IL (US)

(73) Assignee: First Data Corporation, Palo Alto, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/690,765

(22) Filed: Aug. 1, 1996

(51) Int. Cl.⁷ .................................................. G06F 17/60
(52) U.S. Cl. ........................................................ 705/14
(58) Field of Search .......................................... 705/14

(56) References Cited

U.S. PATENT DOCUMENTS

| | | | |
|---|---|---|---|
| Re. 34,915 | * 4/1995 | Nichtberger et al. | 705/14 |
| 4,723,212 | * 2/1988 | Mindrum et al. | 705/10 |
| 4,908,761 | * 3/1990 | Tai | 705/14 |
| 4,949,256 | * 8/1990 | Humble | 705/14 |
| 5,025,372 | * 6/1991 | Burton et al. | 364/406 |
| 5,056,019 | * 10/1991 | Schultz et al. | 705/14 |
| 5,173,851 | * 12/1992 | Off et al. | 705/14 |
| 5,185,695 | * 2/1993 | Pruchnicki | 705/14 |
| 5,200,889 | * 4/1993 | Mori | 705/14 |
| 5,222,018 | * 6/1993 | Sharpe et al. | 705/30 |
| 5,231,569 | * 7/1993 | Myatt et al. | 235/379 |
| 5,245,533 | * 9/1993 | Marshall | 705/10 |
| 5,287,268 | * 2/1994 | McCarthy | 705/14 |
| 5,384,449 | * 1/1995 | Peirce | 235/380 |
| 5,467,269 | * 11/1995 | Flaten | 705/14 |
| 5,515,270 | * 5/1996 | Weinblatt | 705/14 |
| 5,537,314 | * 7/1996 | Kanter | 705/14 |
| 5,612,527 | * 3/1997 | Ovadia | 235/375 X |
| 5,642,279 | * 6/1997 | Bloomberg et al. | 705/14 |
| 5,675,662 | * 10/1997 | Deaton et al. | 382/137 |
| 5,687,322 | * 11/1997 | Deaton et al. | 705/14 |
| 5,710,886 | * 1/1998 | Christensen et al. | 705/14 |

(List continued on next page.)

FOREIGN PATENT DOCUMENTS

WO 95/03570    2/1995   (WO).

OTHER PUBLICATIONS

Cleugh, Mike, "The Future of Financial Services on the Internet", Nov. 1996, Newsletter (United Kingdom), 4 pp.*

Wilson, Linda. "Bank systems earn credit—credit-card issuers say new information systems help them lure customers and stay competitive." InformationWeek, 1994, No. 477, p. 70.*

(List continued on next page.)

*Primary Examiner*—Eric W. Stamber
*Assistant Examiner*—James W. Myhre
(74) *Attorney, Agent, or Firm*—McCutchen, Doyle, Brown, & Enersen, LLP

(57) ABSTRACT

A system and method for operating a computer based targeted payment system discount program. Consumer information from consumer payment system institutions is used to match qualified consumers to targeted merchant discount offers. Offers are automatically prioritized based on their expected value to consumers and consumers receive the highest priority offers for which they qualify. The default prioritization can be altered or overridden by the consumer's payment systems institution. Discounts are automatically applied during the processing of the qualifying purchase without the need for coupons or additional actions by either the merchant or consumer.

74 Claims, 12 Drawing Sheets

U.S. PATENT DOCUMENTS

| | | | |
|---|---|---|---|
| 5,729,693 | * | 3/1998 | Holda-Fleck .............................. 705/14 |
| 5,761,648 | * | 6/1998 | Golden et al. ........................... 705/14 |
| 5,774,868 | * | 6/1998 | Cragun et al. ........................... 705/14 |
| 5,806,044 | * | 9/1998 | Powell .................................... 705/14 |
| 5,822,735 | * | 10/1998 | De Lapa et al. ........................ 705/14 |
| 5,832,457 | * | 11/1998 | O'Brien et al. ......................... 705/14 |
| 5,855,007 | * | 12/1998 | Jovicic et al. .......................... 705/14 |
| 5,983,196 | * | 11/1998 | Wendkos ................................. 705/14 |
| 6,012,038 | * | 1/2000 | Powell .................................... 705/14 |
| 6,014,634 | * | 1/2000 | Scroggie et al. ....................... 705/14 |

OTHER PUBLICATIONS

"The privacy shoe is poised to fall: FTC cracks down on dissemination of data related to market–segmentation strategies of credit cards." Credit Card Management, Mar., 1993, p. 64.*

Ludlum, David. "Shopping carts hold clues to marketing mysteries." Computerworld, Jan. 15, 1990, p. 71.*

International Search Report for International Application No. PCT/US 97/13588 dated Apr. 12, 1997.

"Ukrop's Tests Data Base Marketing Program, Electronic Couponing Tracks Buying Behavior Of Valued Customers"; *Chain Store Age Executive*, Sep. 1987; pp. 73–75 (XP 000567643).

Oliver, Suzanne, "The Battle of the Credit Cards," *Forbes*, (Jul. 1, 1996), p. 62.

* cited by examiner

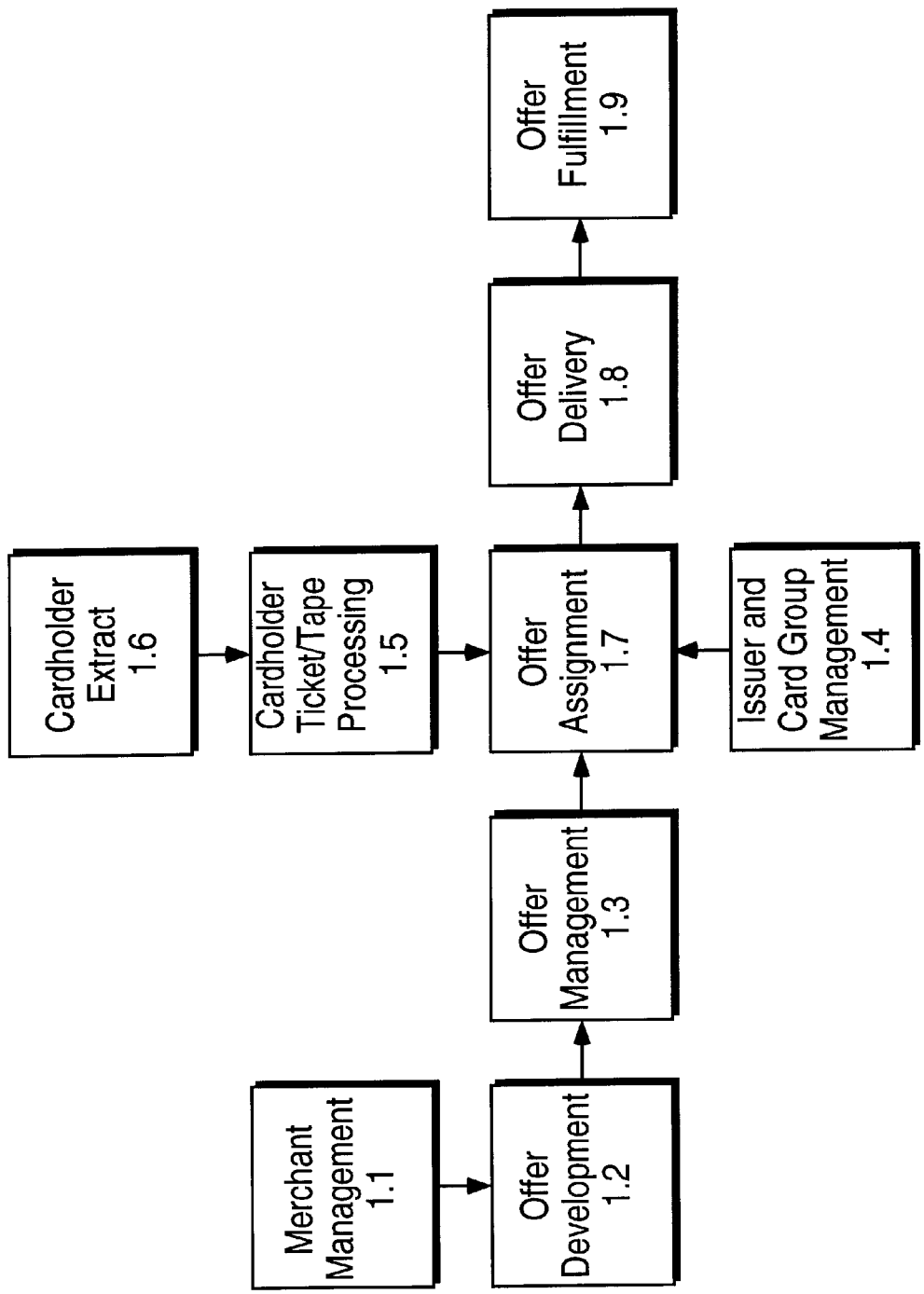
Figure 1 - High Level Overview

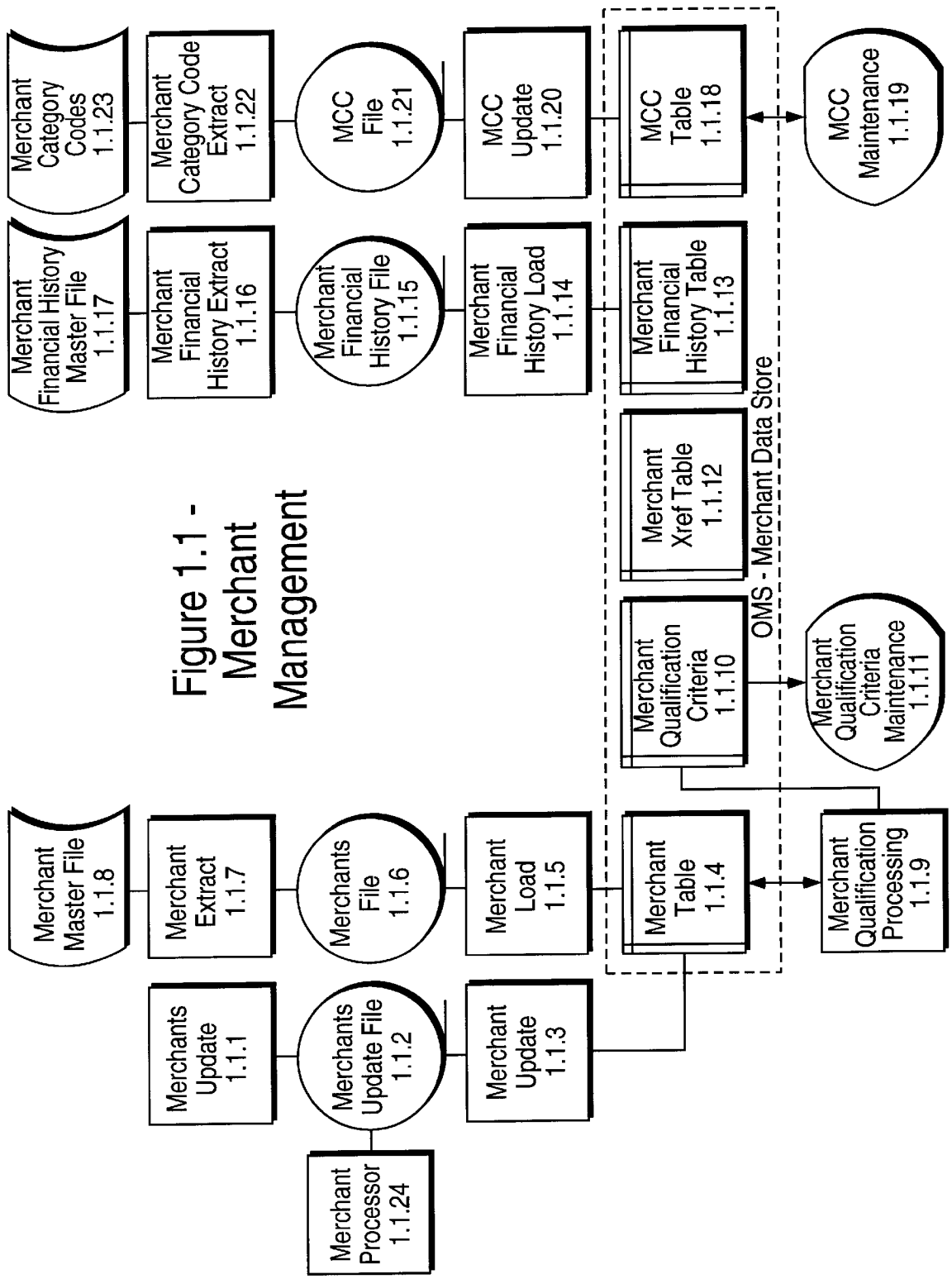
Figure 1.1 - Merchant Management

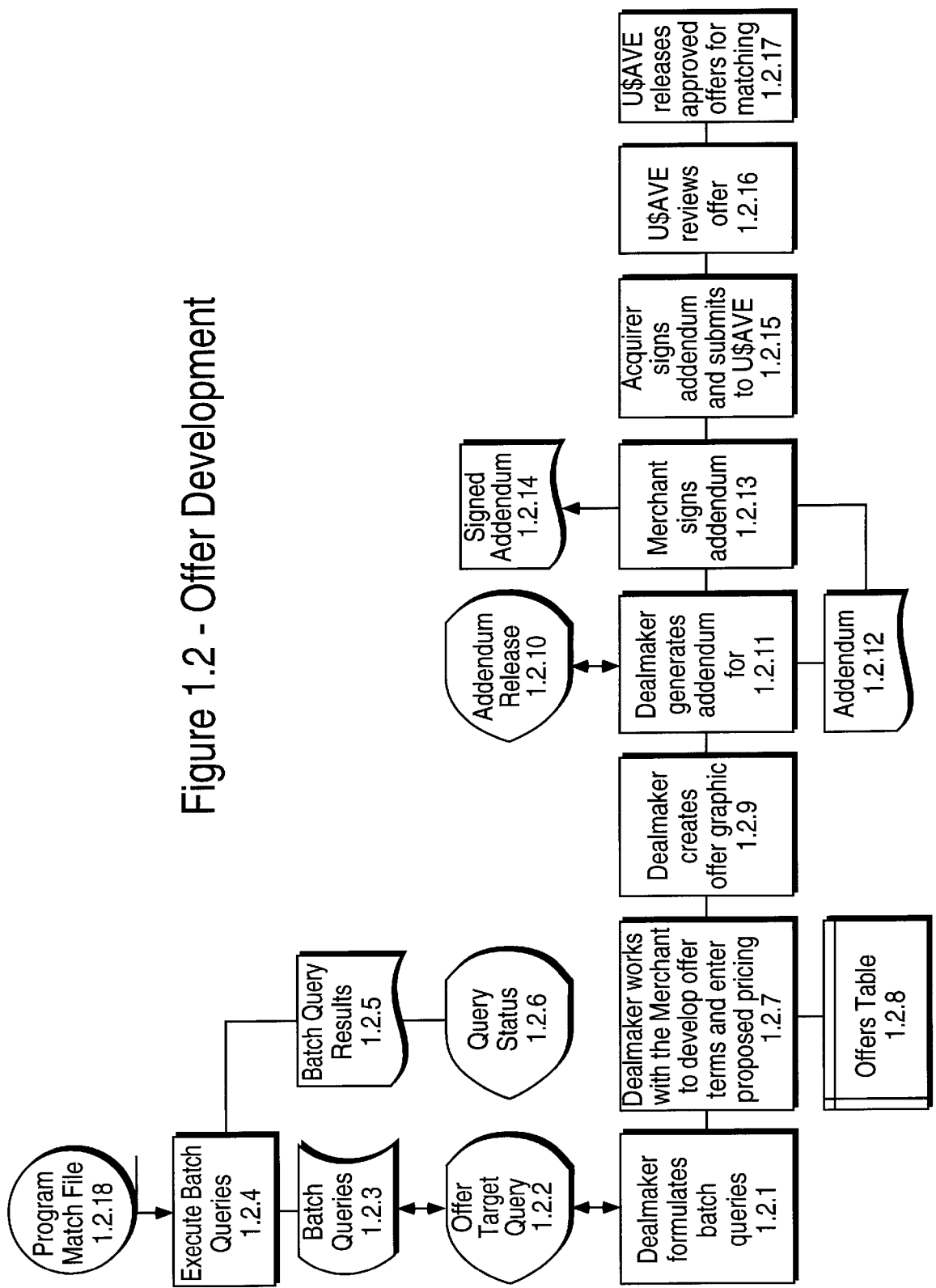
Figure 1.2 - Offer Development

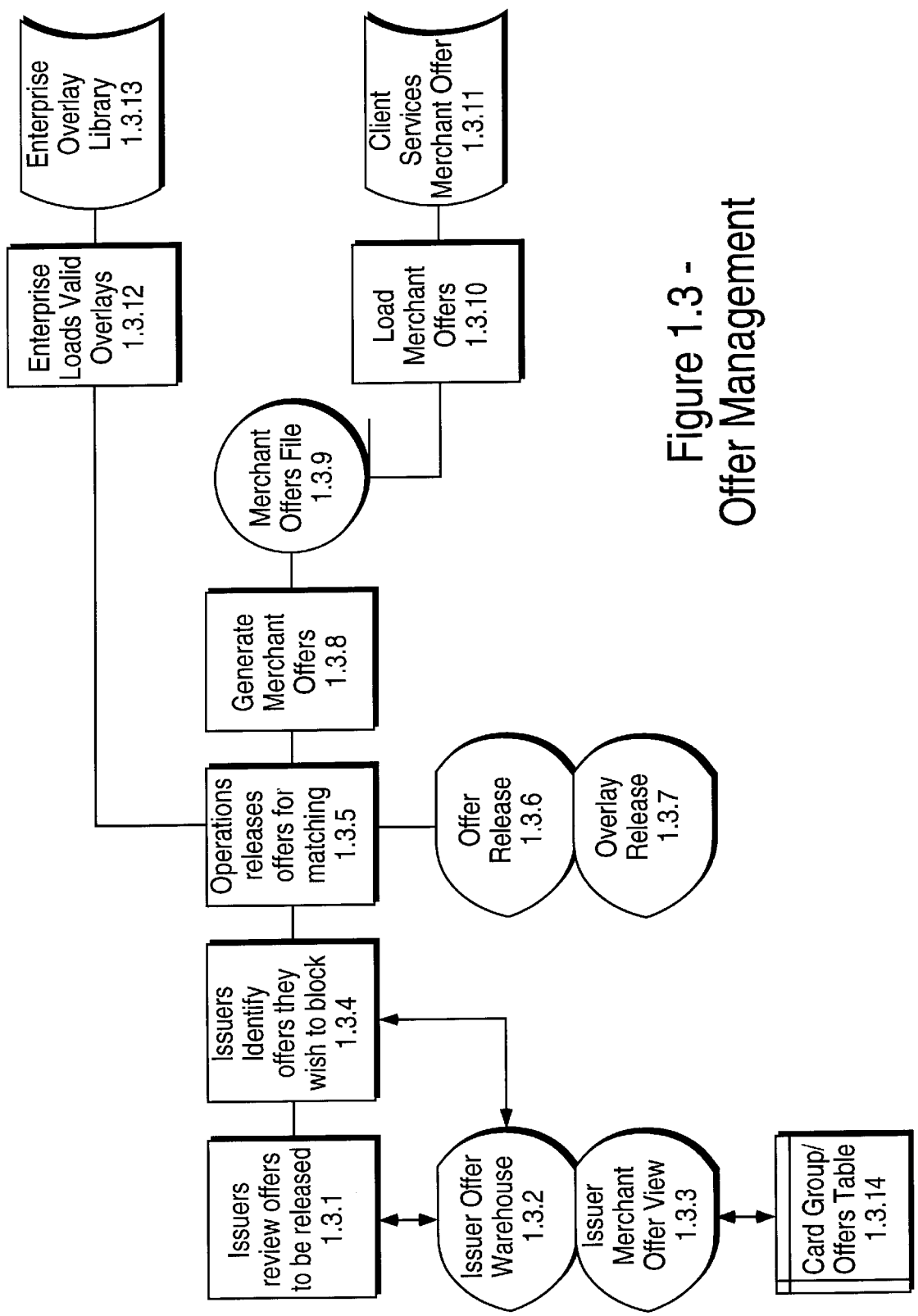
Figure 1.3 - Offer Management

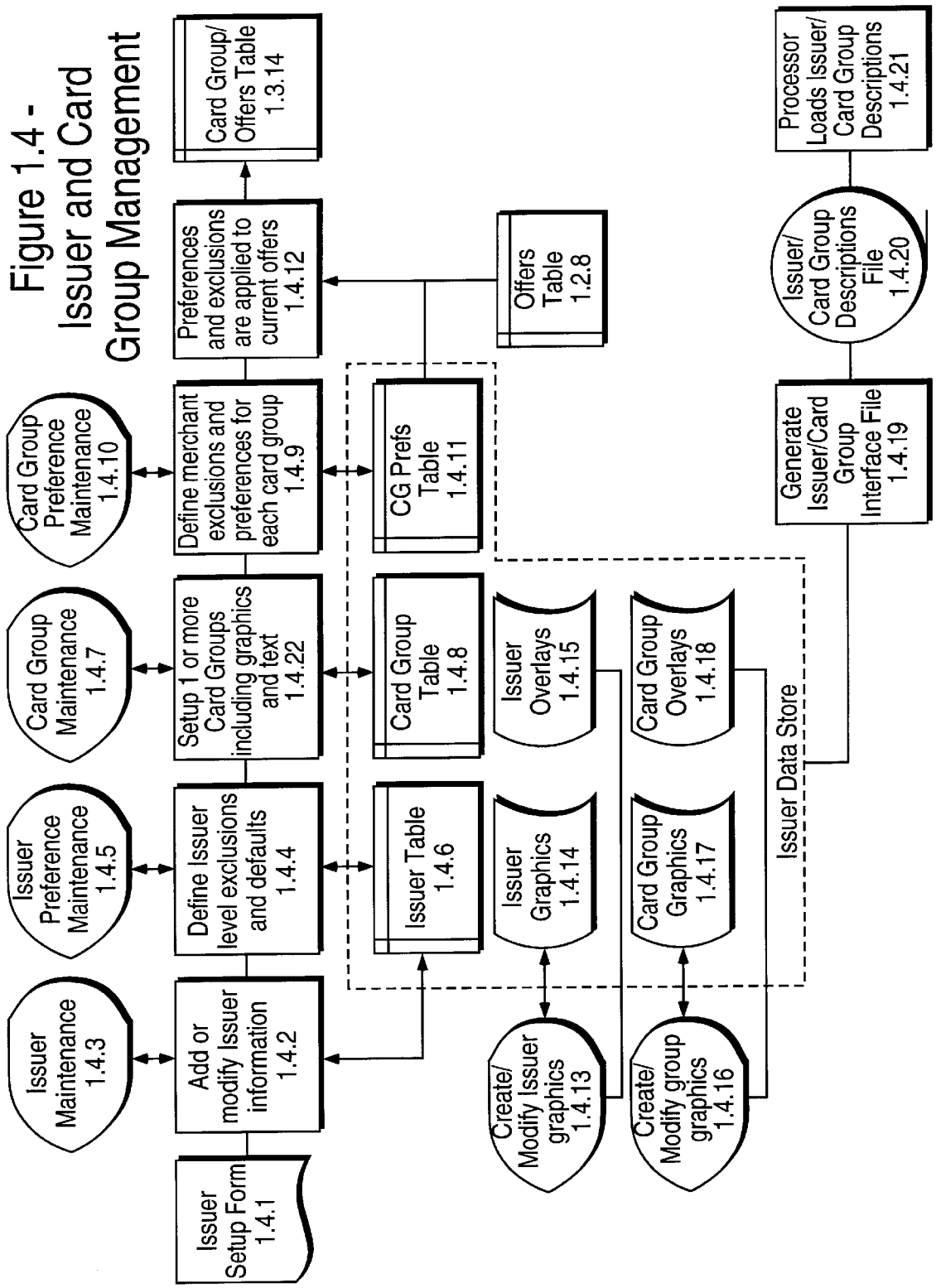
Figure 1.4 – Issuer and Card Group Management

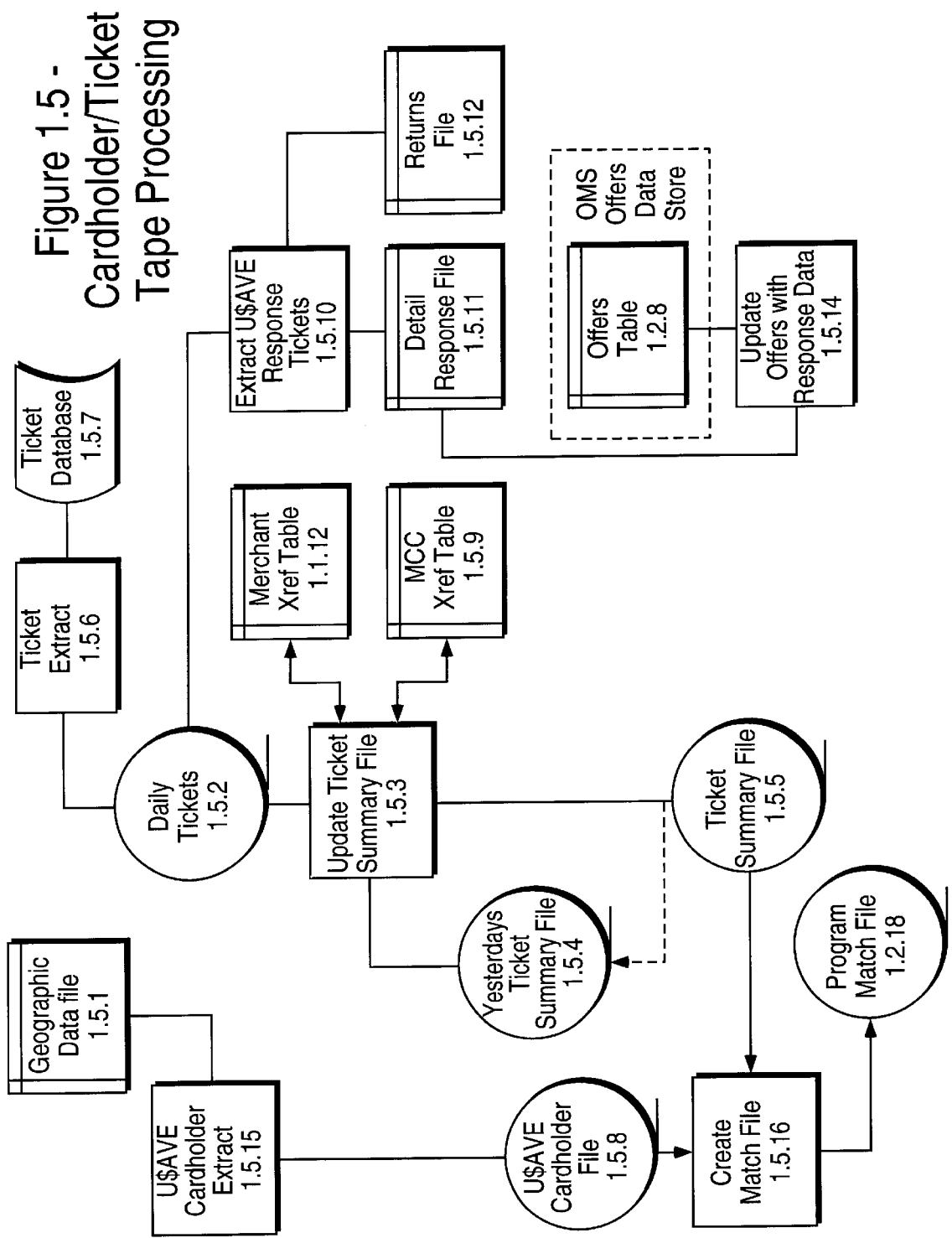
Figure 1.5 - Cardholder/Ticket Tape Processing

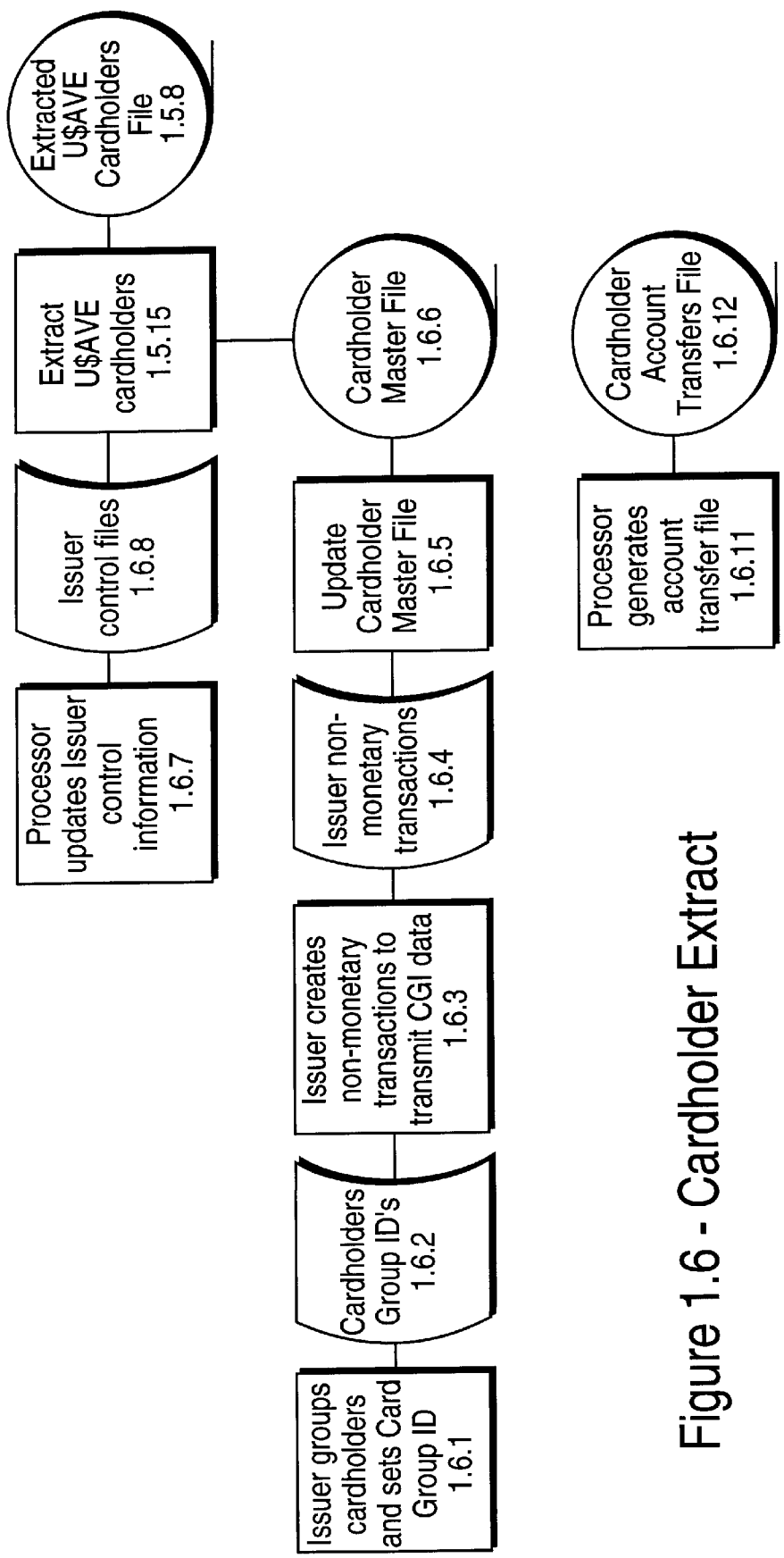
Figure 1.6 - Cardholder Extract

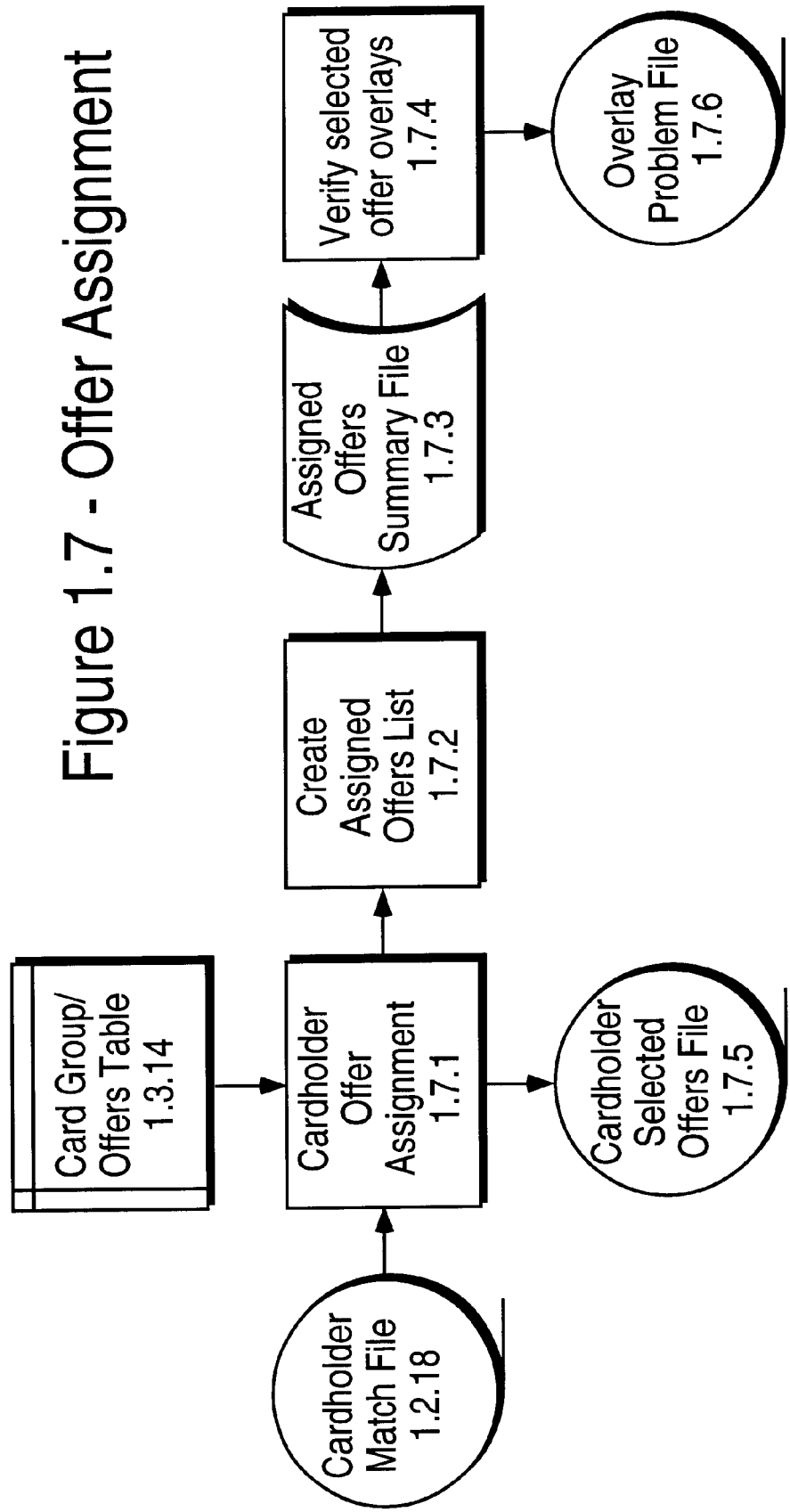
Figure 1.7 - Offer Assignment

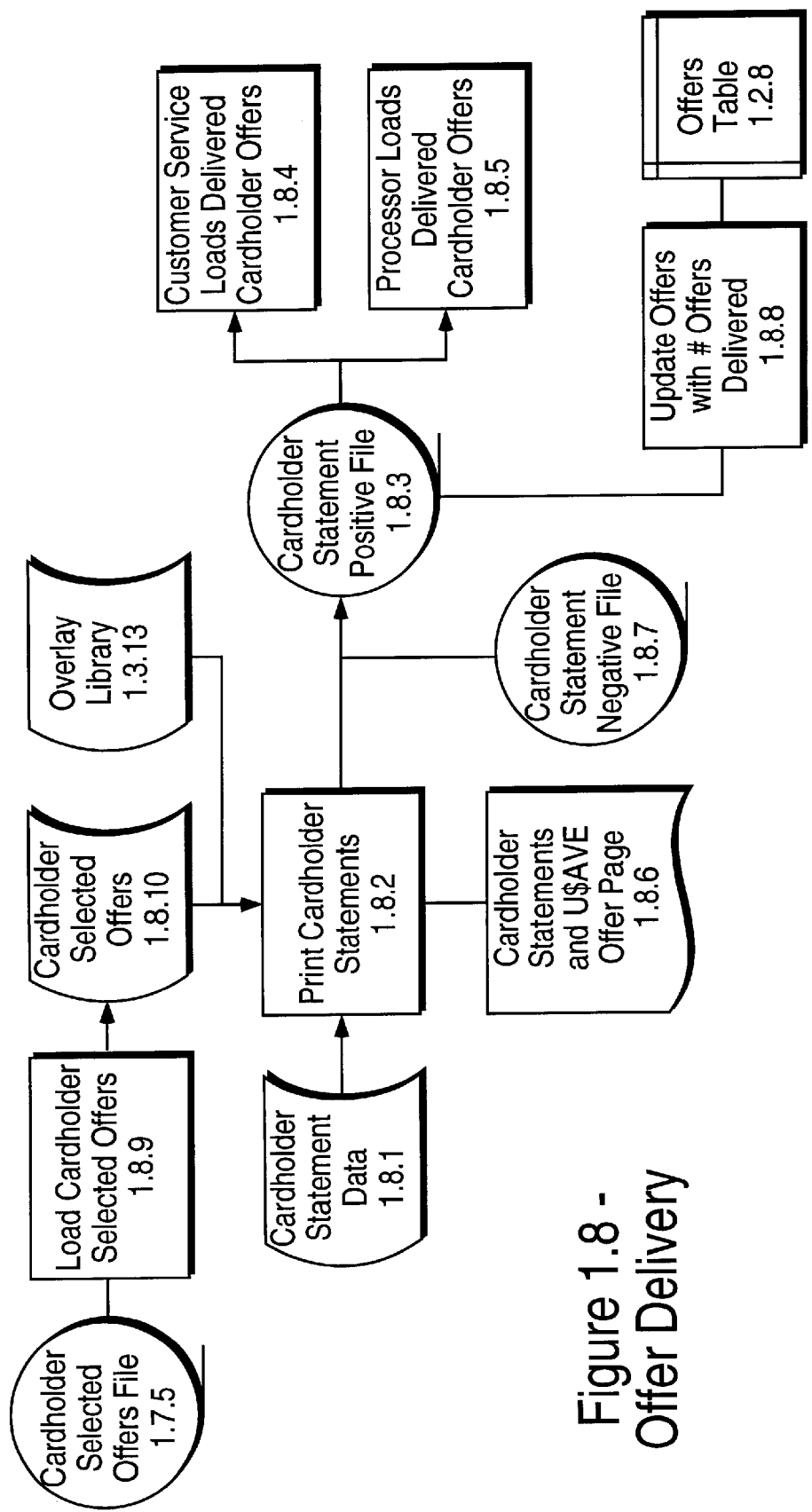
Figure 1.8 - Offer Delivery

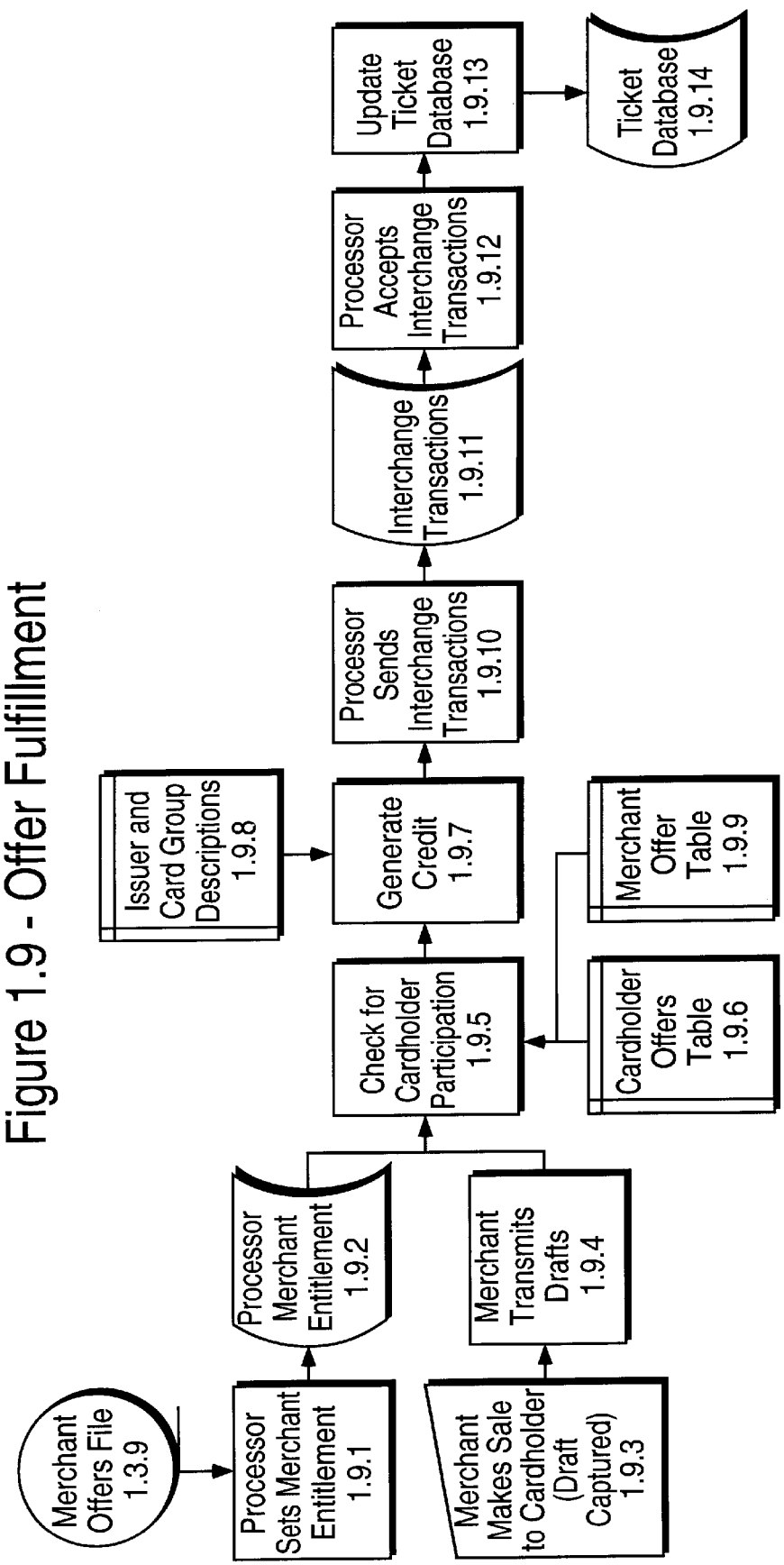
Figure 1.9 - Offer Fulfillment

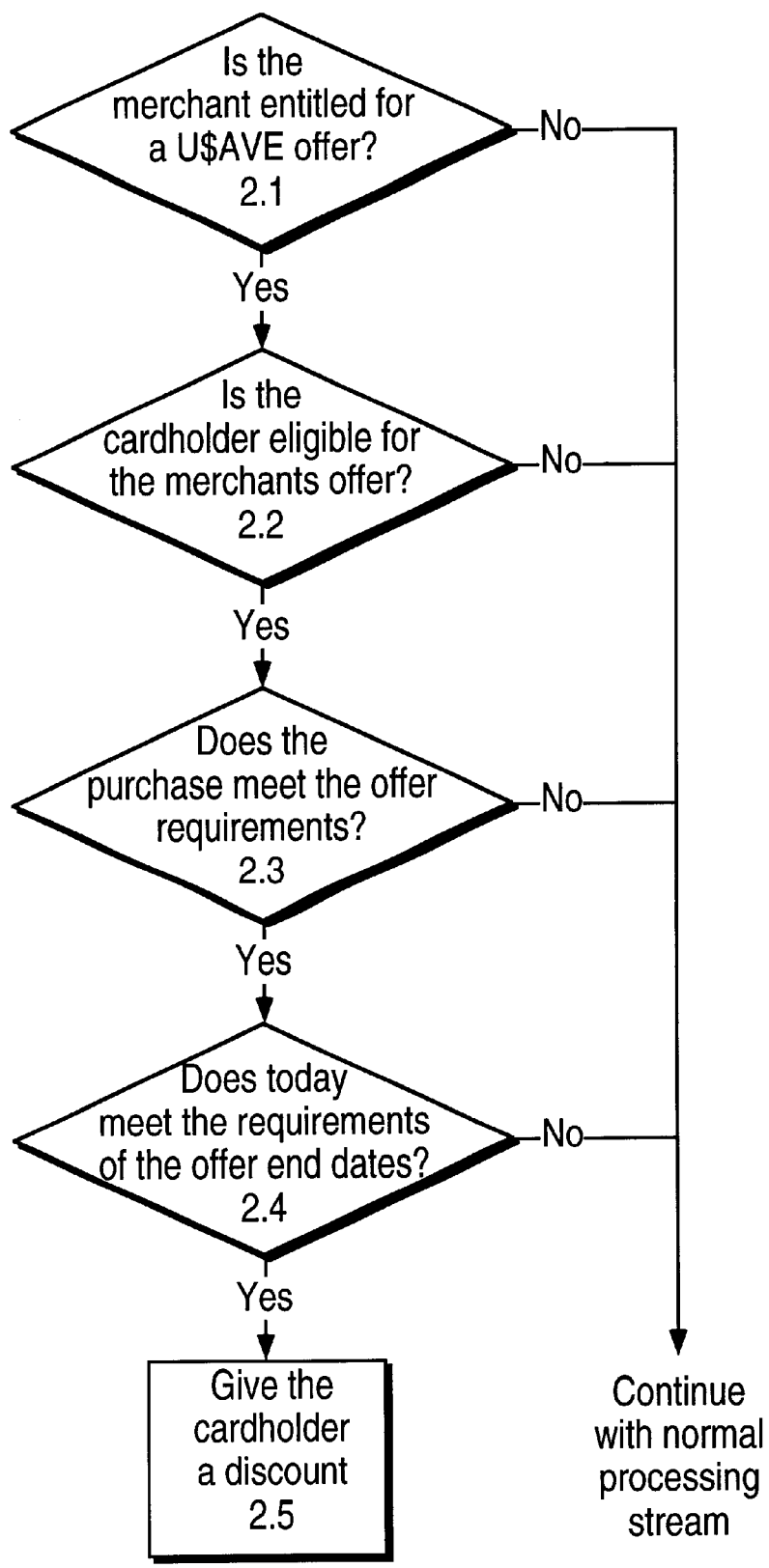
Figure 2 - Check for Cardholder Participation

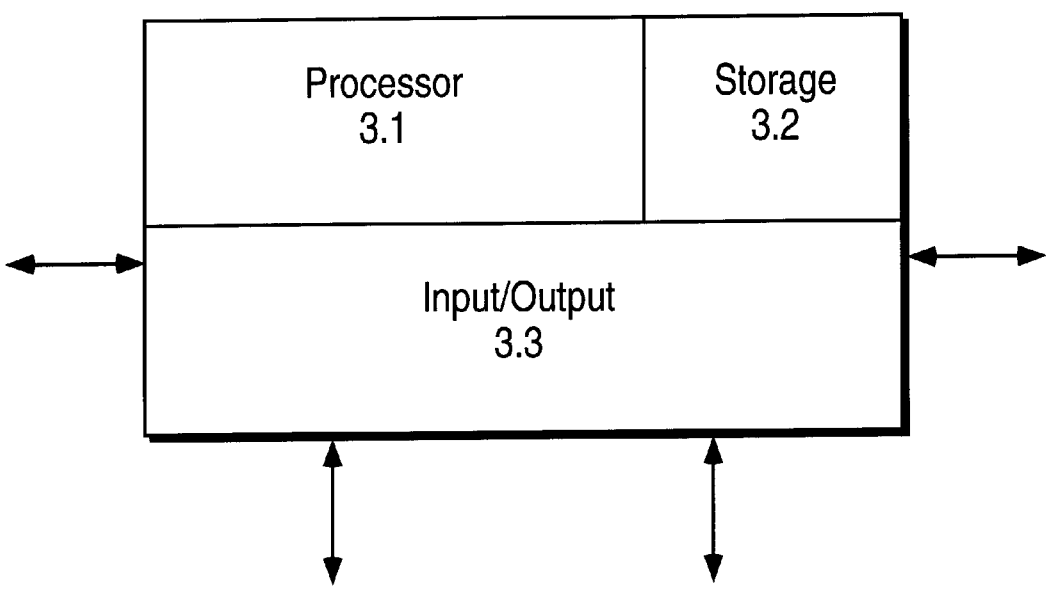
Figure 3 - General Purpose Computer

SYSTEM AND METHOD FOR A TARGETED PAYMENT SYSTEM DISCOUNT PROGRAM

BACKGROUND OF THE INVENTION

As the credit card industry has evolved and grown more competitive over the last twenty years, many credit card issuing financial institutions have attempted to distinguish themselves from their competition by introducing new features and benefits with their credit cards. Among these features have been programs that reward the consumer for using their credit card with reduced interest rates on the purchase amount, accrued rebates redeemable for specified products or services, or coupons redeemable at the time of purchase. Some of the more successful reward programs have been designed to motivate the consumer to make purchases at specific merchants.

It is common practice among the credit card issuers to include inserts with their monthly statements that market merchant products and services. The targeting for these inserts is based, however, on minimal cardholder information such as the cardholder's state, zip code, or credit card type. These sorts of inserts have been found to generate a very low response rate, i.e., have stirred little interest in consumers. It is believed that most cardholders discard the inserts without looking at them.

Focus groups conducted on this subject have found that consumers are interested in receiving discounts for products and services, but only for those items that they consider valuable. It is impossible to evaluate consumer interest in a product or service based only on the geographic location of the consumer's residence.

Merchants are continually looking for ways to effectively market their products and services. Discounts have proven to be an effective method for attracting and retaining customers. Today there are a number of vehicles available to the merchant to provide discounts to potential customers including bulk mailings, newspaper, radio and television advertisements, and targeted marketing.

Targeted marketing is particularly effective and efficient for merchants because it is designed to identify consumers that are more likely than the general public to be interested in the merchant's products or services. One proven method has been to identify consumers that have demonstrated interest by purchasing similar or related products in the past. One way for merchants to obtain such information has been to purchase consumer lists from various providers. These lists are again, however, generally based on rather limited, static targeting criteria.

Merchants thus desire a flexible, cost effective method for finding consumers who will be interested in their products or services. Consumers on the other hand desire discounts on products and services they want or need. Unfortunately, the structure of the bank card world (VISA and MASTER-CARD bankcard) makes the accomplishment of these seemingly parallel goals difficult. Cardholder transaction histories, a key to determining cardholder preferences and thus successful target marketing, are owned and controlled by the cardholders' issuing financial institutions and are unavailable to merchants and their acquiring financial institutions who are separated from the cardholders and their issuers by the VISA and MASTERCARD bankcard interchanges, across which money, but not information, passes.

Merchants and their acquirers do not therefore have access to the cardholder information necessary to provide targeted offers, and issuers do not have the access to merchants necessary to design targeted offers deemed valuable by their cardholders. An individual financial institution that serves as both an issuer and acquirer may bridge the gap for its own merchants and cardholders, but targeting to this smaller subset of cardholders is obviously of less value to merchants and the limited range of merchant offers is similarly of less value to cardholders and will be less effective in stimulating card usage. The divide between merchants and their acquirers and cardholders and their issuers can be bridged however by a credit card processor that receives information from both sides of the interchange and has the processing capacity to perform the necessary offer matching, delivery, and fulfillment.

SUMMARY OF THE INVENTION

The purpose of the present invention is to meet the objectives of merchants (which includes service providers) and consumers as well as the financial institutions on both sides of the interchange. Specifically, the goal is to provide merchants with a flexible, cost effective method to provide a large number of interested consumers with value propositions that discount the merchants products and services, and to provide consumers, or cardholders, with a broad range of merchant offers in which they will be most interested. A further goal and effect of the invention will be to increase the use of the bankcards of participating financial institutions, which provides a convenient automated means for implementing targeted discounts without the need for coupons, mailings, or additional transactions on the part of either the cardholder or merchant. Finally, the invention meets the above objectives while at the same time preserving the consumers' privacy by avoiding the dissemination of the cardholders' transaction histories to merchants or outside financial institutions.

To meet these objectives the invention utilizes five basic steps: (1) an automated process which enables the merchant to target consumers based on purchase behavior and geographic location; (2) an automated process which matches targeted merchant offers against a data base of consumers and historical purchase behavior; (3) an automated process which provides the consumer with the best value propositions from multiple merchants/service providers; (4) the ability for the consumer to act on the value proposition and receive an automated credit for the discount amount without the need of a coupon or additional transactions; (5) an automated process which reports on the execution of the discount transaction to the consumer and merchant.

In the first step, the merchant can, through an automated process, define targeting criteria based on consumer historic purchase activity by Merchant Category Code (MCC) or specific merchant ID. This gives the merchant the ability to target consumers that have transacted at their location, competitors en masse, or complimentary MCCs. For example, a boating merchant can target consumers that have made purchases at boating merchants, boating service stations, or sporting goods stores. The merchant can further focus the targeting of historic purchase activity by requiring a specific number of prior purchases and/or a minimum dollar amount spent at the targeted merchants during a specific period. Other targeting criteria available to the merchant include airline travel information, months since last move, credit limit, credit instrument available funds, consumer state, and consumer five digit zip code. Merchants or their acquirers can submit preliminary batch queries to determine the number of cardholders who would qualify for a particular proposed discount offer. Merchants can thereby fine tune their target criteria to reach an audience of the desired size and level of interest.

Merchants can define the discount amount of the value propositions to be a percentage of the total purchase or a flat dollar amount. They can also define whether the value proposition is a one time offer or unlimited for a specified promotion period. If the value proposition can be redeemed more than once, the merchant can vary the discount percentage or amount between the first and subsequent purchases. The merchant can also define a minimum or maximum purchase amount, as well as a maximum discount amount.

Once the target criteria have been defined, an automated process matches the value propositions against the consumer data base supplied by the participating issuers to find eligible consumers. Each consumer will receive multiple value propositions from different merchants. The limit on the number of value propositions provided to each consumer each month is defined by a parameter in the automated system. If the consumer is eligible for more than that limit, the automated system will select the best value propositions. In the preferred embodiment, value propositions are prioritized based on the total transaction dollar volume that they are expected to generate, a good proxy for determining those value propositions that consumers will most likely respond to and find valuable. The formula used to calculate expected total transaction dollar volume depends on a number of features of the offer. This prioritization formula will be updated automatically as data on actual offers is received.

This prioritization of merchant offers may be altered by the cardholder's issuing financial institution. Issuing institutions may automatically or manually either exclude or preference particular offers for particular cardholders. For instance, if an issuing bank is also participating in a co-branding program with an oil company, it may want to, or be contractually required to, exclude its co-branded cardholders from receiving discount offers from competing oil companies. Or, a bank may want to use additional demographic information on its cardholders to override or further refine the default prioritization of offers to certain or all of its cardholders in an attempt to further maximize card usage and customer satisfaction (and obtain a competitive advantage over other issuers).

Through an automated process, consumers receive notification of the value propositions available to them along with the pertinent information: discount amount, minimum or maximum purchase (if applicable), maximum discount amount (if applicable), and expiration date. The redemption of the value propositions is automatic when the consumer uses his or her credit card at the merchant/service providers establishment. No coupon is provided or required. The purchase transaction is processed through the merchant/service provider's acquiring institution where the discount is applied. The original purchase transaction along with the discount transaction is sent to the consumer's issuing financial institution where it is processed and recorded on the consumer's next statement. The purchase and the discount transaction are also provided on the merchant's next statement by its acquiring institution. After the offer period has expired, merchants automatically receive reports summarizing the response rate, i.e. success of their offers.

BRIEF DESCRIPTION OF THE DRAWINGS

FIG. 1 is a diagram of the major process flows of the invention;

FIG. 1.1 is a diagram of the Merchant Management process;

FIG. 1.2 is a diagram of the Offer Development process;

FIG. 1.3 is a diagram of the Offer Management process;

FIG. 1.4 is a diagram of the Issuer and Card Group Management process;

FIG. 1.5 is a diagram of the Cardholder/Ticket Tape processing;

FIG. 1.6 is a diagram of the Cardholder Extract process;

FIG. 1.7 is a diagram of the Offer Assignment process;

FIG. 1.8 is a diagram of the Offer Delivery process;

FIG. 1.9 is a diagram of the Offer Fulfillment process;

FIG. 2 is a diagram of the process flow involved in checking for cardholder participation.

FIG. 3 is a diagram of a general purpose computer used for invention.

DETAILED DESCRIPTION

FIG. 1 shows an overview of the major process flows of the Targeted Payment Systems Discount Program ("the Program"). Block 1 represents Merchant Management which entails the collection and maintenance of information on all participating merchant outlets required for the implementation of the Program. This information is maintained in the Merchant Data Store, a collection of files which includes the Merchant Table, Merchant Financial History Table, Merchant Category Code Table and the Merchant Qualification Criteria. Block 1 is expanded and further explained in FIG. 1.1. Block 4 represents Issuer and Card Group Management which entails the collection and maintenance of data on the issuers and their cardholders who may be subdivided by the issuer into up to 36 separate card groups. Block 4 is expanded and further explained in FIG. 1.4. Block 6 represents the process of extracting participating cardholders from the participating issuers' Master Cardholder files. This block is expanded and further explained in FIG. 1.6. Block 5 represents Cardholder and Ticket Tape Processing, i.e., the means by which the transaction histories of participating cardholders are updated and incorporated in the Program Matching File for use in the Cardholder Offer Assignment process. Block 5 is expanded and further explained in FIG. 1.5. Block 2 represents the Offer Development process whereby merchants and their acquirers formulate and test discount offers and developed offers are entered into the official offer pool. Block 2 is expanded and further explained in FIG. 1.2. Block 3 represents the Offer Management processes which includes the review of offers by issuers, their prioritization into value tiers, and the final release of offers for use in the matching process. Block 3 is expanded and further explained in FIG. 1.3. Block 7 represents the Offer Assignment process. This includes the matching of offers with cardholders, their distribution to cardholders who qualify for more than the maximum number of offers, and the "fair share" allocation of oversubscribed offers. Block 7 is expanded and explained further in FIG. 1.7. Block 8 represents the process of automatically notifying cardholders of the best offers for which they qualify. Block 8 is expanded and explained further in FIG. 1.8. Block 9 represents the Offer Fulfillment process in which offers completed by qualifying cardholders are automatically detected and the resulting discounts credited to the cardholders account. Block 9 is expanded and further explained in FIG. 1.9.

FIG. 1.1 details the Merchant Management process through which all of the data on all participating merchants required for implementation of the Program is collected and maintained in the Merchant Data Store (1.1.4, 1.1.10, 1.1.12, 1.1.13, 1.1.18). The collected data is necessary for the offer prioritization process and the issuer preference and exclusion processes which will be discussed in more detail in the context of the Offer Assignment process detailed in FIG. 1.7.

Every week in step 1.1.7 a file is created from the Merchant Master File, 1.1.8, listing all participating Merchants. The result is the Merchants File 1.1.6. The Merchants File is then pre-processed in the Merchant Load step 1.1.5, wherein each merchant record is supplemented with an Area of Dominant Influence (ADI) which is assigned based on the merchant's five digit zip code. The resulting supplemented records are stored in the Merchant Table 1.1.4.

To keep closer tabs on Merchants whose status has changed (e.g., has suffered financial problems or closed outlets) a Merchant Update File 1.1.2 is sent daily from a Merchant Processor 1.1.24. This file contains all the changes which were made to the merchant's record. This information is added to the Merchant table (1.1.4) through the Merchant Update step (1.1.1, 1.1.3) again, new merchants will be added and existing merchants will be updated but merchants will not be deleted during this process. The daily Merchant Update is primarily to track particularly time critical information, e.g. the discovery of a fraudulent merchant.

The monthly sales and transaction information on all merchant outlets is extracted from the Merchant Financial History Master File (1.1.16, 1.1.17) and imported to the system in the form of the Merchant Financial History File (1.1.15). Records from this file are added monthly in the Merchant Financial History Load step to the Merchant Financial History Table (1.1.13) in the Merchant Data Store. The table contains up to 13 months of financial and transaction summary information for each merchant outlet. During the Merchant Financial History Load step (1.1.14), the 14th month of data is deleted from the table.

VISA and MASTERCARD bankcard Merchant Category Code (MCC) information on participating merchants is stored in the MCC File (1.1.21, 1.1.22, 1.1.23) which is updated monthly (1.1.20) with information from the Merchant Processor. This file is used to update the records in the MCC Table (1.1.18), which is maintained in MCC Maintenance (1.1.19), in the Merchant Data Store. The records in the MCC Table also contain manually entered MCC Cluster data that is maintained during the update process. New MCC's may be added during the update but old MCC records are not deleted.

To qualify for participation in the program, merchants must satisfy the Merchant Qualification Criteria contained in 1.1.10 (which is monitored by the Merchant Qualification Criteria Maintenance 1.1.11) in the Merchant Data Store. The Merchants may be disqualified from participation based on their MCC, Merchant ID, Annual Dollar Volume, Annual Transaction Volume, or Acquiring Bank. Whenever information is changed in the Merchant Table (1.1.4), the merchants must be requalified by execution of the Merchant Qualification Processing Step (1.1.9) which requires comparison of the Merchant data in the Merchant Table (1.1.4) with the Merchant Qualification Criteria (1.1.10).

The Offer Development process is detailed in FIG. 1.2. In step (1.2.7) the Dealmaker, working with the Merchant, creates a new proposed promotion. A promotion will contain one or more offers to be delivered to cardholders. The promotion contains the basic information common to the related offers. The promotion information required of the dealmaker or merchant includes: Name (a short name for the promotion, e.g., "Toys 'r' Us National Spring 96 Sales Campaign"); Begin Date (Month and Year-all promotions begin on the first of the month); End Date (Month and Year-promotions always end on the last day of the month); Description (a multi-line detailed description of the promotion).

Dealmakers and merchants can customize their offers in several ways to best suit the merchant's need and goals. Offer discounts can be either a percentage or dollar amount. Discounts can apply only to first purchases or to all purchases or can be phased with different discounts between the initial and subsequent purchases. Discounts can be limited by requiring a minimum purchase or maximum discount per cardholder or maximum audience size, i.e., by capping the number of cardholders who can receive the offer.

The ability of merchants to target a specific population of cardholders based on purchasing behavior and account characteristics is an important element of the Program. Merchants can select targeting criteria based on the following cardholder data: state of residence; ADI (Area of Dominant Influence, a television marketing term that defines metropolitan areas); ZIP3 (first three digits of the cardholder's zip code); months since last move; credit limit; open to buy (credit limit minus current balance); purchase history and travel information.

Purchase history is a particularly important targeting criteria. The Program maintains a purchase history for each of the participating issuer's cardholders in which the number and dollar volume of a cardholder's transactions are summarized into three types of quarterly "buckets"; by merchant, MCC (Merchant Category Code), and overall. Merchants may also target cardholders based on travel data, i.e., the number of trips to a particular destination airport per quarter (where plane tickets were charged on the consumers participating bankcard). Finally, merchants can target consumers base on their response rate to prior Program offers, specifically the number of responses to offers by quarter, either overall, by MCC or by merchant. All purchase history transaction data is summarized in calendar quarter buckets. The Program maintains five quarters of data, the current and the last four complete. For targeting purposes, cardholder activity can be summarized over any combination of quarters which need not be consecutive.

When targeting a cardholder population, merchants can use any or all of the characteristics listed above and logical "and" and "or" operators can be used to combine criteria. In (1.2.1) Dealmakers, can create one or more batch queries which can be executed nightly to determine the number of cardholders which meet the merchants target criteria. Batch queries are entered through the Offer Target Query Screen (1.2.2) and are stored in the Batch Queries File (1.2.3). The Batch Queries are executed and matched against the Program Match File (1.2.18) in step 1.2.4. Batch query results are stored in 1.2.5 and are supplied to the Dealmaker or Merchant on Query Status Screen (1.2.6).

The finalized offers are then added to the Offers Table (1.2.8) and assigned to one of three value tiers based on a value score proportional to the expected transaction dollar volume, a measure of the expected value of the offer to cardholders. The value score is calculated as a function of 6 parameters:

(1) Discount percentage. For offers which have "stepped" discounts, the higher discount level is used. For offers which a dollar off rather than a percent off, the dollar amount is converted to a percent by dividing it by the minimum purchase if there is one, or the average merchant ticket amount if the offer has no minimum purchase.

(2) Targeting Score. This factor is intended to reflect how targeted the offer is and can take one of three discrete values.

(3) Average Ticket. This is the merchants average ticket over the preceding twelve months.

(4) Duration Score. This factor is intended to reflect the number of times a cardholder can act on an offer. Offers in which only the first purchase is discounted are given a 1. Offers in which subsequent purchases are discounted a lesser amount are given a 2, and offers in which all purchases are discounted the same amount are given a 3.

(5) Industry Volume Score. This parameter is used to take into account the transaction level of the MCC. The Score can be either 1, 2 or 3 depending on the merchants MCC.

(6) Minimum Purchase Required. Offers which require a minimum purchase receive a 1 and offers which do not receive a 2.

The Value Score is currently calculated as a linear function of these parameters (except 10/SQRT(Avg. Ticket) is used instead of Average Ticket). The seven constants in the formula are calculated by least squares linear regression using total transaction dollar volume data as it becomes available. Other more complicated predicting formulas may be used and are under examination including neural networks.

Offers are placed in one of the three value tiers based on their value score. The minimum value score for each tier is stored in a table and can be updated as needed to provide for a more even distribution of offers among the tiers. After the value tier assignment is made it is displayed on-line for the dealmaker or merchant to review.

In step (1.2.9) the dealmaker creates an offer graphic to be used as an overlay on the receiving cardholders bankcard statement sent. Dealmakers/Merchants can select a logo from the Program standard library. If the dealmaker wishes to use a logo that is not in the library, he can request a custom logo on-line. The custom logo request will be routed to Program Headquarters. The dealmaker then forwards the artwork and a fee. After Program Headquarters loads the new logo into the library, the dealmaker will receive on-line notification that the logo is ready for use. All offer overlays are required to follow the same general approved format. The Offer Management system will generate all overlays using the data elements selected by the dealmaker. Each month these files are sent to the offer delivery system for loading into the production library.

In steps (1.2.10, 1.2.11) the Dealmaker generates the contracts (Addenda 1.2.12) which must be executed by the merchant and its acquirer before a merchant offer can be accepted in the Program. The contracts are then forwarded to the necessary parties. A participating merchant must have an Executed Offer Addendum Agreement (1.2.13, 1.2.14) for each Program offer they wish to make. Every offer maintained in the Program "deal warehouse" must have an active and mutually executed addendum. Once an offer addendum has been signed by the merchant and Acquirer, it is mailed to the Program Headquarters (1.2.15) for approval and storage.

In step (1.2.16) the program administrator reviews the offers and verifies that: the copy and logo are in sync; the logo and copy meet technical standards (overlay dimensions, font, excessive use of black toner, 240 dot per inch (dpi) resolution quality graphics) the offer meets the substantive standards required by the program; the offer copy and overlay match the description in the contract addendum; the offer text has no typographical errors and accurately conveys the information on the merchant overlay and Offer Addendum; an executed Master Contract with the Merchant and Acquirer is on-file and active; the offer meets any pricing standards required by the program; the Merchant's current status is favorable; and the Merchant passes all Program risk controls. If the offer fails one of the above test, it is rejected and sent back to the dealmaker to be brought into compliance. Otherwise, a Program representative will sign the Offer Addendum and officially release the Merchant's offer(s) into the "deal warehouse" for matching (1.2.17).

FIG. 1.3 details the Offer Management process. In steps 1.3.1–1.3.3, Issuers are able to review each of the offers in the Card Group Offers Table (1.3.14) which contains the specific offers that will be delivered to the cardholders in each of the issuers card groups. Issuers can review the effect that their preferences and exclusions had on the current month's offers and during the review process can manually block or preference specific card groups from receiving particular offers using the Offer Warehouse screen.

If the merchant offer information is complete, merchant offers which are not blocked (1.3.4) are locked in and released for the matching process in step (1.3.5). Offers for which the merchant information is not finalized are removed.

During step 1.3.8 Generate Merchant Offers, Merchant's outlet entitlement criteria is applied to all of a merchants outlets. Those outlets which meet the criteria are eligible to participate in the offer and are added to the Merchant Offers File (1.3.9) as a new record. The outlet entitlement criteria currently available for use by merchants are 1) Outlet #, 2) Outlet City, State 3) Outlet State, 4) Outlet ADI. If a merchants opens any additional qualifying outlets during the promotion run, those outlets will be automatically identified during the daily Merchant Update Process (1.1.3), added to the participating outlets list, and sent on the daily Merchant Offers file (1.3.9) to the merchant processor, using Load Merchant Offers (1.3.10) and Client Services Merchant Offers (1.3.11), for outlet entitlement.

In step (1.3.12) the locked in merchant overlays in the Overlay library are delivered in the Overlay Files (1.3.13).

FIG. 1.4 details Issuer and Card Group Management through which cardholder information and cardholder segmentation by the issuers is received into the program. This information includes the Issuers' Processor Client number which is used to identify participating cardholders and tickets during the Cardholder Extraction process. Issuers also provide the definitions of one or more Card Groups into which their participating cardholders are segmented. The Card Group information may be provided either on the Issuer Setup Form (1.4.1) or electronically through a direct link between the Issuer and Program Headquarters (not shown). The received information is written and stored in the Issuer Table (1.4.6) in the Issuer Data Store. Additional or modified information on either new or existing issuers can be entered in the Issuer Table (1.4.6) through the Add or Modify Issuer Information process (1.4.2).

Issuers can prevent any of their cardholders from receiving particular offers by defining issuer-level merchant exclusions which can be entered into the Issuer Table (1.4.6) using the Issuer Maintenance (1.4.3) and Issuer Preference Maintenance Screen (1.4.5). Issuers can define exclusions (1.4.4) based on Program Merchant ID; Merchant MCC or MCC Cluster (or all offers from a particular MCC or MCC Cluster except those from particular enumerated merchants); or Merchant Type (i.e., National/Regional or Local).

The Card Group definitions are entered in the Card Group Table (1.4.8) in the Issuer Data Store, through the Card Group Maintenance (1.4.7), Card Group Preference Maintenance Screen (1.4.10) and Setup (1.4.22). The Card Group Table (1.4.8) includes the text description included on the cardholders statements to identify Program credit and return transactions. This description is placed in the same field in the cardholders statement in which the merchant's name appears in the record of the associated sale transaction. One descriptor will be provided for each Issuer Card Group. Though, the Issuer may elect to provide the same descriptor for all Issuer/Card Groups. These credit and return transaction descriptors are limited to 22 characters to ensure that the same descriptor can be used for both VISA and MASTERCARD bankcard transactions.

Issuers can separately affect the offers received by the members of different Card Groups by providing merchant exclusion and prioritization parameters for each Card Group. This information is entered through the Card Group Preference Maintenance Screen (1.4.7 and 1.4.9) and is stored in the Card Group Preferences Table (1.4.11). Issuers can include, exclude or prioritize offers for each Card Group based on the following merchant parameters, Program Merchant ID Number; Merchant Category Code, Merchant Type (National/Regional, or Local). Using this automated process, issuers can largely avoid manually reviewing and ranking offers within each card group. Use of the parameters and Card Groups provides an automated and manageable process for issuers to deal with the large number of offers and potential contractual conflicts (e.g., Affinity or Co-brand programs) while at the same time allowing for differentiation (and competition) from other issuers. A history of all changes made to the ranking and selection rules is maintained for audit and control purposes.

The Issuer and Card Group Description Table is stored at the merchant processor and provides the credit and return transaction descriptor text to be used for each member financial institution. This text is placed in the credit and return transactions and is printed on the cardholders statement. Each issuer will have different text, thereby allowing them to distinguish and "brand" their card groups. Each month, the processor loads the new Issuer/Card Group Descriptions File (1.4.21), using the Issuer/Card Interface File (1.4.19) whereby the records in the Issuer and Card Group Descriptions File (1.4.20) are added to the Table. Production of text and graphics for the offers is shown in steps 1.4.13 to 1.4.18.

The Cardholder and Ticket Tape Processing steps to create and update the Program Match File (1.2.18) are detailed in FIG. 1.5. In Step (1.5.6), the processor, using the Issuer Card Groups, extracts (1.5.10) the tickets for each participating Program (1.5.7) issuer and writes them to an extraction file (1.5.2). This file will, at the end of the process, contain all of the tickets for the participating issuers (not just the tickets for participating cardholders). This extraction process takes one of two forms depending on whether or not the Issuer is new to the program. When a new issuer joins the program a New Issuer One-Time Load is required in which all tickets for the past 122 days are extracted from the processor on-line database. For issuers who are already participating in the program, only the past day's tickets are extracted.

The resulting Daily Tickets File (1.5.2) is preprocessed to add additional fields. The resultant records are added to the previous days tickets (1.5.4) to create a new Ticket Summary File (1.5.5). This process uses merchant and MCC information found in the Merchant Xref Table (1.5.9) and the MCC Xref Table (1.1.12) to provide the cross-reference numbers for MCCs and merchants. The Ticket Summary File summarizes cardholder purchase activity by merchant, MCC, MCC Cluster, and Airline Destination City. The file stores transaction and dollar amount totals for all sales and returns (not just those under the Program) for each of the last five quarters (four quarters plus the current quarter). This update process is run daily.

The Program Cardholders File (1.5.8) is created in step (1.5.15) which is repeated monthly. The Extract Program Cardholders File (1.5.15) which was created in the Cardholder Extraction Process is received, formatted and preprocessed to add additional fields. Additional data elements are then added to the records including the cardholders' ADI, found in the Geographic Data File Table (1.5.1). Cardholder records with a 'Z' in the Card Group field (i.e., records for cardholders who have been excluded from participating in the program by their issuer) are not included in the Program Cardholders File (1.5.15).

Monthly Match File Creation (1.5.16) is run where a participating cardholder's purchase information, stored on 1.5.5, is merged with the cardholder information, stored on 1.5.8, to create the Program Match File (1.2.18) which is used during Cardholder Offer Assignment (1.7.1).

During the daily ticket processing in step (1.5.3), a copy of each Program ticket and return is saved in the Detail Response File (1.5.11). This table is used to monitor the offers, and create management and member reports. Similarly a record of each non-program return transaction, regardless of issuer is saved in the Returns File (1.5.12). Only return records from the last 90 days are maintained in this file, older records are purged. The purpose of this file is to allow for easy monitoring of potential fraudulent return activity.

In Step 1.5.14 the Offers Table (1.2.8) and Card Group Offer Table is updated daily with information from the Detail Response File (1.5.11) in order to allow tracking of offer performance on a daily basis. Offer response data added to the Offers Table (1.2.8) through this process includes: Number of Purchases (add day's transactions to current total); Gross Purchase Amount (add day's ticket amounts to current total ticket amount) as well as Number of Returns and Gross Return Amount.

FIG. 1.6 details the Cardholder Extraction process. Through this process, the Master File of participating cardholders and their card group assignments is updated monthly. In step (1.6.1, 1.6.2) the issuers in the Program define a Card Group for each of their participating cardholders. As described above, Card Groups are used to segment the issuer's cardholders into manageable categories for purposes of ranking Program offers and specifying custom selection criteria. The grouping characteristics are determined by the issuer who codes each cardholder account with a one a one-character Card Group identifier via a "non-monetary" electronic transaction. Correspondingly, an Offer Management System screen will setup the same Card Group identifiers and issuer-chosen descriptions so that the card groups can be used in both screen displays and reports to categorize, summarize, and manage sets of cardholders.

Each issuer can define as many as 36 different card groups each of which is represented by a single character '0' through '9' and 'A' through 'Z'. A value of Z in the Card Group field on a cardholder's record in the Cardholder Master File means that the cardholder has not been selected to participate in the Program. Participating cardholders are those who have not opted-out and whose issuing bank has selected them for participation (by not assigning them to card group Z).

The non-monetary electronic transactions (1.6.3., 1.6.4) through which the issuer sends the processor the cardholders Card Group can be submitted by the issuer at any time, are processed as they are received, and are used to update the Cardholder Master File (1.6.5). The updated information will not be reflected in the Program Master Database, however, until the next monthly processing cycle.

The Issuer Definition File (1.6.8) which contains a unique client number for each participating issuer is received into the system each month and used to update (1.6.7) the Issuer Control file which is matched against the Cardholder Master File in the final Cardholder Extraction in which the records of all of the cardholders for each of the participating issuers are copied from the Cardholder Master File to the Extracted Program Cardholder File. The Account Transfer File is then generated (1.6.11, 1.6.12).

FIG. 1.7 details the Offer Assignment process. After offers have been received in the Offer Management System and assigned a value tier, but before the offer warehouse is opened for matching, each Card Group's preference criteria are applied to the available offers. This results in six value tiers of offers A1, A, B1, B, C1 and C for each card group where the "1" value tiers meet the preference criteria specified by the issuer for that card group.

The first step in assigning offers to a cardholder is to determine the Card Group to which the Cardholder belongs. The matching engine then uses the Match File (1.2.18) and the Card Group Offers Table (1.3.14) assign offers from that Card Groups A1 tier until a pre-set number of assignments have been (currently 10). If the engine does not find 10 offers in tier A1, it either goes to tier A or B1 depending on whether the issuer has chosen "Value" or "Preference" matching. If an issuer chooses "Value Matching" the tiers are ranked A1, A, B1, B, C1, C. If the issuer chooses "Preference Matching", the tiers are ranked A1, B1, C1, A, B, C. Once a cardholder is assigned ten offers the engine moves on to the next cardholder. During this first pass, a counter is kept of the number of cardholders assigned an offer.

After all cardholders have been assigned ten offers, a second "fair share" assignment pass is made. Two critical factors create the need for a second "fair share" offer assignment pass. First, cardholders are read in sequential order (i.e. grouped by Issuer). Second, some merchant offers are capped (i.e., are sent to a limited number of cardholders). Without a fair share pass, cardholders at the bottom of the list would never receive capped offers. During the "fair share" run, offers which are "oversubscribed" are reallocated evenly throughout the list of cardholders. E.g., if the offer was over subscribed by a factor of 10 every tenth cardholder who received it in the first pass gets it in the second pass. At the end of the second assignment pass, cardholders keep the first six offers still available to them from the ten assigned during the first pass.

In step (1.7.5), after the assignment process is completed, the Selected Offers Files are created. For each Card Group, the total number of cardholders assigned to each merchant offer is determined and stored in the Issuer/Card Group Offers Tables. The Assigned Offers Summary File (1.7.3) is created containing one record for each merchant offer delivered to one or more cardholders in any Card Group, and is used in step (1.7.4) to verify that each merchant offer in the file has a corresponding offer overlay. The absence of an overlay (1.7.6) is communicated to the Program Headquarters so that the offer overlay can be transmitted for inclusion in the overlay library.

FIG. 1.8 details the offer delivery system. In steps 1.8.9, 1.8.10, the Cardholder Selected Offers File (1.7.5) is received into the statementing system each month. This file contains the cardholder account and the merchant offers that the cardholder will be delivered. The Cardholder Selected Offers File is then matched with the Overlay Library (1.3.13) which contains each of the possible offer overlays for the current month. Each offer overlay in the Overlay Library is coded to match a unique merchant offer. Each cardholder record delivered in the Cardholder Selected Offers file contains one or more of these merchant offer identifiers.

In steps (1.8.2, 1.8.6) the Cardholder Statements with the appropriate offer overlays are printed. Before the offers are printed, however, the Issuer Policy Information must be matched with the statementing accounts in the Cardholder Statement Data file (1.8.1) from the nightly cycle to determine which cardholders get statemented. Because the cardholder characteristics may have changed between the time that the cardholder was identified as eligible for certain offers and the time the statement is actually printed, the system performs edits against the cardholder account, to confirm that the cardholder has not opted-out or otherwise become ineligible for the program and may have to be excluded from receiving an offer page.

After the statements are printed, the system creates a Cardholder Statement Positive File (1.8.3) which contains a record for each cardholder who was delivered a Program statement page. Similarly, a Cardholder Statement Negative File (1.8.7) is created which contains a record for each cardholder who did not receive a Program statement and a reason code indicating why no statement was sent. In step (1.8.8) the Cardholder Statement Positive file (1.8.3) is used to update a variable within the Offers Table (1.2.8) which tracks the running total of the number of cardholders which have been delivered an offer.

The Cardholder Statement Positive File (1.8.3) is also delivered daily to the two subsystems which process the cardholder and merchant transactions. In step (1.8.4), the cardholder processor adds the offers contained in the File to its own Cardholder Offers Table which contains all active offers and expired offers for a period of six months beyond the expiration date. Similarly, in step (1.8.5) the Cardholder Statement Positive File is used to update the merchant processor's Cardholder Offers file which contains an up-to-date account of all offers that have been delivered to a cardholder in the past 180 days.

FIG. 1.9 details the Offer Fulfillment process. In Step (1.9.1), Merchant Entitlement to participate in the Program for the month is set. The Merchant Offers File (1.3.9) which contains information on participating merchants is transmitted to the Merchant Processor where the information from the file is added to existing merchant accounts processing information. Thereafter, when a participating merchant makes a sale to a qualifying cardholder who has received the merchants discount offer, the cardholder will receive the discount as an automatic credit without any further action (beyond normal credit card sales processing) on behalf of either the merchant or the cardholder. In Step (1.9.3) the merchant transmits the sales draft to the processor as it would any other credit card sale. The processor then determines whether the card holder is entitled to a credit on the transaction (1.9.5) by comparing the transaction information from the draft with the Merchant Entitlement information in the (1.9.2) file, Cardholders Offers Table (1.9.6) and Merchants Offers Table (1.9.9). The logic of this determination process is shown explicitly in FIG. 2. A cardholder is eligible for a Program credit if: (1) they purchased goods or services from a merchant who is currently participating in the Program; (2) they were designated as being eligible for a merchant offer (i.e., they were sent an offer along with their monthly bankcard statement); (3) they met the requirements of the specific offer being run by the merchant (e.g., have made the minimum purchase); and (4) the sale is made during the offer period.

The Program credit is then generated in step (1.9.7). The amount of the credit depends on the details of the offer (e.g., discount percentage and or amount) which are contained in the Merchant Offer Table. For processing through the interchange, the credit transaction is assigned the same transaction number as its associated purchase transaction. Special product codes are create which corresponding to either VISA or MASTERCARD bankcard Program credits. A description of the credit transaction is taken from the Issuer/Card Group Descriptor Table (1.9.8) which is indexed by issuer ID and Issuer Card Group. These two values are retrieved from the Cardholder Offers Table and used as the unique key to look up the appropriate record in the Issuer/Card Group Descriptor Table, the credit transaction description text is retrieved from the record and incorporated into the available text space on the credit transaction. The maximum text length is 22 characters so that the same text can be used for both VISA and MASTERCARD bankcard transaction.

If the draft submitted in steps (1.9.3, 1.9.4) is a purchase reversal (a return of merchandise) the merchant processor checks the Merchant Processor U$AVE Transaction Database to 1) determine if the cardholder had previously transacted on an offer from the merchant, and 2) if the purchase amount of the offer matches the returned amount on the purchase reversal. If both conditions are true, a debit is generated, in the step (1.9.7), for the amount as the previously issued credit. This permits the merchant to recoup the credit they had issued on the original transaction.

In step (1.9.10, 1.9.11) the processor sends the transaction through the interchange. In step (1.9.12) the issuer's processor accepts the interchange transaction, recognizes and flags it as a Program transaction and updates the Ticket Database (1.9.13, 1.9.14) to include the transaction. This information is passed back and updates the ticket file and the response file.

This detailed description is of an embodiment of the invention in a credit card processing environment. Upon reviewing the disclosure herein, embodiments of the invention in any other payment transaction processing system, including checks, debit cards, private label cards, and on-line electronic payment systems will be obvious to those of ordinary skill in the art. Similarly, though the communications and statements in the embodiment described in the detailed description take the form of printed mailings, it would be equally obvious to one of ordinary skill in the art that they could be replaced with electronic visual or audio communications. Such variations or modifications are intended to be encompassed within the scope of any claims to patent protection issuing upon this invention.

FIG. 2 demonstrates a general manner of visualizing the process (compatible with what is described in the other figures) required to check for Cardholder Participation, with the self-explanatory steps of 2.1–2.5. Finally. FIG. 3 is a diagram of a general purpose computer that is used in the invention, illustrating a processor 3.1, storage 3.2, and general input/output interfacing, 3.3.

What is claimed is:

1. A method for implementing a targeted payment system discount program on a general-purpose digital computer at a processing institution having data storage memory comprising the steps of:

(a) receiving and storing consumer information concerning participating consumers supplied by one or more payment systems institutions each of which supplies payment means to a subset of the participating consumers;

(b) receiving and storing information on merchant discount offers from at least one merchant or acquirer which includes discount information, transaction requirements, and consumer target criteria;

(c) identifying qualifying consumers for a merchant discount offer by computer matching the consumer target criteria for the merchant discount offer with the consumer information concerning participating consumers;

(d) comparing consumer transactions of qualifying consumers with the transaction requirements of the merchant discount offer; and (e) returning a calculated discount to qualifying consumers who meet the transaction requirements of the merchant discount offer via a payment systems institution.

2. The method of claim 1 wherein the consumer information is supplied by a plurality of payment systems institutions.

3. The method of claim 1 wherein the information on merchant discount offers is obtained from a plurality of merchants or acquirers.

4. The method of claim 2 wherein the information on merchant discount offers is obtained from a plurality of merchants or acquirers.

5. The method of claim 1 further comprising the step of automatically notifying participating consumers of said merchant discount offers for which they qualify.

6. The method of claim 5 wherein the participating consumers are notified of only a subset of the merchant discount offers for which they qualify.

7. The method of claim 6 wherein the subset of merchant discount offers for which the participating consumers qualify and of which they are notified is determined based on a prioritization of discount offers using a prioritization function of expected transaction volume, total discount, and total purchase amount.

8. The method of claim 7 wherein said prioritization function is equal to expected response dollar volume, wherein the expected response dollar volume is calculated based on a plurality of parameters relating to each of said merchant discount offers.

9. The method of claim 8 wherein one of said parameters is a merchant's past transaction dollar volume.

10. The method of claim 8 wherein one of said parameters is a merchant's industry's past transaction dollar volume.

11. The method of claim 8 wherein one of said parameters is the discount percentage of a merchant discount offer.

12. The method of claim 8 wherein one of said parameters is the ratio of the discount amount of a merchant discount offer to the average purchase amount at the offering merchant.

13. The method of claim 8 wherein one of said parameters is the ratio of the discount amount to the minimum purchase requirement of a merchant discount offer.

14. The method of claim 8 wherein one of said parameters is the ratio of the minimum purchase requirement of a merchant discount offer to the average purchase amount at a merchant.

15. The method of claim 8 wherein one of said parameters is the average purchase amount at a merchant.

16. The method of claim 8 wherein one of said parameters is a function of limitations placed on the discounts available under a merchant discount offer.

17. The method of claim 8 wherein one of said parameters is the number of discounted purchases which can be made under a merchant discount offer.

18. The method of claim 8 comprising the further step of using a computer and information on actually transacted dollar volumes resulting from merchant discount offers to modify the prioritization function.

19. The method of claim 1 wherein a payment systems institution modifies the parameters of a merchant discount offer.

20. The method of claim 1 comprising the further step of automatically modifying a merchant discount offer for which a consumer cardholder otherwise qualifies based on criteria provided by a payment systems institution.

21. The method of claim 20 wherein said criteria include at least one of the following: demographic characteristics of a participating consumer, type of payment means involved, characteristics of a merchant discount offer, and characteristics of a merchant.

22. The method of claim 20 wherein said modifying prevents a particular participating consumer from receiving a merchant discount offer for which he otherwise qualifies.

23. The method of claim 20 wherein said modifying affects prioritization of merchant discount offers and thus changes the merchant discount offers which a participating consumer is actually presented with.

24. The method of claim 20 wherein said modifying affects the order in which the merchant discount offers are printed on a participating consumer's statement.

25. The method of claim 6 comprising the further step of preventing particular participating consumers from receiving particular merchant discount offers.

26. The method of claim 6 comprising the further step of modifying prioritization of merchant discount offers, thereby changing the merchant discount offers which a participating consumer is actually presented with.

27. The method of claim 1 comprising the further step of modifying the order in which merchant discount offers are printed on a consumer cardholder's statement.

28. The method of claim 1, comprising the further steps of:
(a) automatically determining the number of qualifying participating consumers identified in the identifying step for a merchant discount offer; and
(b) supplying a merchant with the number of qualifying consumer cardholders for the merchant discount offer so that the merchant can assess the likely success of the merchant discount offer.

29. The method of claim 1, comprising the further step of automatically reporting periodically to a merchant the response rate among participating consumers to the merchant's discount offer.

30. The method of claim 1 wherein one item of the consumer information is the participating consumer's payment transaction history.

31. The method of claim 1 wherein one item of the consumer information is the participating consumer's prior responses to merchant discount offers.

32. The method of claim 1 wherein one item of the consumer information is the participating consumer's zip code.

33. The method of claim 1 wherein one item of the consumer information is the participating consumer's Area of Dominant Influence.

34. The method of claim 1 wherein one item of the consumer information is the participating consumer's state.

35. The method of claim 1 wherein one item of the consumer information is the participating consumer's spending limit.

36. The method of claim 1 wherein one item of the consumer information is the amount the participating consumer has available to spend.

37. The method of claim 1 wherein one item of the consumer information is the number of months since the participating consumer's last change of residence.

38. The method of claim 1 wherein one item of the consumer information is the participating consumer's travel information.

39. The method of claim 1 wherein a merchant discount offer is restricted to a limited number of participating consumers.

40. The method of claim 1 wherein a merchant discount offer is restricted to a limited number of participating consumers and comprising the further step of distributing said restricted merchant discount offers in a systematic manner.

41. The method of claim 1 comprising the further steps of:
(a) receiving custom indicia; and
(b) automatically displaying said custom indicia in a payment system institution's communication to a consumer cardholder.

42. The method of claim 1 comprising the further steps of:
(a) receiving descriptive text; and
(b) automatically displaying said descriptive text in a payment system institution's communication to a participating consumer.

43. The method of claim 1 wherein said merchant discount offers can be limited to particular outlets of a merchant.

44. The method of claim 1 wherein merchants provide form information concerning the form of said merchant discount offers including whether said merchant discount offers (a) involve a flat or percentage discount, (b) apply to single or multiple purchases, (c) have a maximum discount, (d) require minimum purchases, or (e) have a maximum purchase amount.

45. The method of claim 1 comprising the further steps of:
(a) receiving an offer overlay describing said information regarding a merchant discount offer; and
(b) automatically printing overlays on consumer statements based on the offer overlay information.

46. The method of claim 1 comprising, if the merchandise involved in a merchant discount offer transaction is later returned, the further step of subtracting a calculated discount via a payment systems institution.

47. A system for implementing a targeted payment system discount program at a processing institution comprising:
(a) means for data storing in a computer memory consumer information concerning participating consumer, which is supplied by one or more payment systems institutions each of which supplies payment means to a subset of the participating consumers;
(b) means for data storing in a computer memory, information on merchant discount offers from at least one merchant or acquirer which includes discount information, transaction requirements, and consumer targeting criteria;
(c) means for identifying qualifying consumers for a merchant discount offer by computer matching the consumer target criteria for the merchant discount offer with the consumer information concerning participating consumers;
(d) means for comparing consumer transactions of qualifying consumers with the transaction requirements of the merchant discount offer; and (e) means for returning a calculated discount to qualifying consumers who meet the transaction requirements of merchant discount offer via a payment systems institution.

48. The system of claim 47 wherein the consumer information on consumer cardholders is received from a plurality of payment systems institutions.

49. The system of claim 47 wherein the information is received from a plurality of merchants or acquirers.

50. The system of claim 47 wherein a payment systems institution modifies the parameters of a merchant discount offer.

51. The system of claim 47 further comprising means for automatically modifying a merchant discount offer for which a participating consumer otherwise qualifies based on criteria provided by a payment systems institution.

52. The system of claim 51 wherein said criteria include at least one of the following: demographic characteristics of a participating consumer, type of credit instrument involved, characteristics of a merchant discount offer, and characteristics of a merchant.

53. The method of claim 51 wherein said modifying prevents a particular participating consumer from receiving a merchant discount offer for which he otherwise qualifies.

54. The system of claims 51 wherein said modifying of prioritization of merchant discount offers, changes the merchant discount offers which a participating consumer is actually presented with.

55. The system of claims 51 wherein said modifying affects the order in which merchant discount offers are printed on a participating consumer's statement.

56. The system of claim 47 further comprising means for preventing particular participating consumer from receiving particular merchant discount offers.

57. The system of claim 47 further comprising means for modifying prioritization of merchant discount offers, thereby changing the merchant discount offers which a participating consumer is actually presented with.

58. The system of claim 47 further comprising:
(a) means for automatically determining the number of qualifying consumers identified in the identifying step for a merchant discount offer; and
(b) means for supplying a merchant with the number of qualifying consumers for a merchant discount offer so that the merchant can assess the likely success of the merchant discount offer.

59. The system of claim 47 further comprising:
(a) means for receiving custom indicia; and
(b) means for automatically displaying said custom indicia in a payment systems institution's communication to a participating consumer.

60. The system of claim 47 further comprising:
(a) means for receiving descriptive text; and
(b) means for automatically displaying said descriptive text in a payment systems institution's communication to a participating consumer.

61. The system of claim 47 further comprising:
(a) means for receiving offer overlay information regarding a merchant discount offer; and
(b) means for automatically printing offer overlays on consumer statements based on the offer overlay information.

62. The system of claim 47 further comprising, if the merchandise involved in a merchant discount offer transaction is later returned, means for subtracting a calculated discount via a payment systems institution.

63. A computer-implemented method at a processing institution of targeting offers for merchant discounts to consumers, comprising:
receiving consumer information for at least one consumer, said consumer information being received from one or more consumer payment institutions;
receiving merchant discount offer information respecting one or more offers for merchant discounts, said merchant discount offer information received from one or more merchants or acquirers, said merchant discount offer information comprising targeting criteria for determining, at least in part, whether said one or more offers for merchant discounts will be available for said at least one consumer;
determining, responsive to said consumer information and said merchant discount offer information, if at least one of said offers for merchant discounts will be available to said at least one consumer; and
providing said merchant discount to said at least one consumer via one of said one or more consumer payment institutions.

64. A computer-implemented method in accordance with claim 63 further comprising;
providing said at least one consumer an indication that said merchant discount is offered to said at least one consumer.

65. A computer-implemented method in accordance with claim 64 wherein providing said indication comprises providing information to said consumer in a printed mailing.

66. A computer-implemented method in accordance with claim 64 wherein providing said indication comprises providing information to said consumer in an electronic communication.

67. A computer-implemented method in accordance with claim 66 wherein said electronic communication includes a visual component.

68. A computer-implemented method in accordance with claim 66 wherein said electronic communication includes an audio component.

69. A computer-implemented method in accordance with claim 63 wherein said consumer payment institutions comprise an on-line electronic payment system.

70. A computer-implemented method in accordance with claim 63 wherein providing said merchant discount comprises:
by a merchant offering said merchant discount, transmitting transaction data for a sale to said at least one consumer; and
determining whether said merchant discount is available for said sale to said at least one consumer.

71. A computer-implemented method at a processing institution of fulfilling a discount on a sale made by a merchant to a consumer, said merchant one of a plurality of merchants, said consumer one of a plurality of consumers, said plurality of merchants determined responsive to merchant discount offer information received from one or more merchants or acquirers, said merchant discount information comprising targeting criteria for determining, at least in part, consumers to which offers should be made available, said plurality of consumers determined responsive to consumer information from one or more consumer payment institutions and said merchant discount information, said computer-implemented method comprising:
receiving transaction data for said sale, said transaction data transmitted by said merchant;
determining whether said discount is eligible on said sale by said merchant based on said transaction data;

determining whether said consumer qualifies for said discount, and, if so:
- generating a credit in the amount of said discount in favor of said consumer; and
- transmitting transaction information for said credit to an interchange, which then processes the credit transaction information.

72. In a system for providing offers for merchant discounts to consumers, said system including a processing institution, wherein in said system consumer information is supplied by one or more payment systems institutions to said processing institution, merchant discount offers are supplied by at least one merchant or acquirer to said processing institution and include consumer targeting criteria and transaction requirements criteria, consumer transactions that qualify for said merchant discount offers are determined responsive to, at least, said consumer targeting criteria and said transaction requirements criteria, and said discount is returned through one of said one or more payment systems institutions, a method carried on by one of said merchants comprising:
- providing information about a discount offer, said information comprising transactions for which said discount should be made available and targeting criteria for determining consumers to which said discount should be offered;
- participating in a said sales transaction, said sales transaction being one for which said discount is made available, said sales transaction with one of said consumers to which said discount is offered; and
- reporting said sales transaction to said processing institution, whereupon said processing institution determines if said consumer qualifies for said discount offer for said sales transaction and said processing institution provides an indication via an interchange for one of said one or more payment systems institutions to provide said discount to said consumer.

73. In a system for providing offers for merchant discounts to consumers, said system including a processing institution, wherein in said system consumer information is supplied by one or more payment systems institutions to said processing institution, merchant discount offers are supplied by at least one merchant or acquirer to said processing institution and include consumer targeting criteria and transaction requirements criteria, consumer transactions that qualify for said merchant discount offers are determined responsive to, at least, said consumer targeting criteria and said transaction requirements criteria, and said discount is returned through one of said one or more payment systems institutions, a method carried on by one of said payment systems institutions comprising:
- extracting information respecting prior transactions of consumers;
- providing said information respecting prior transactions of consumers to said processing institution, whereupon said processing institution generates a record for an offer for a discount at a merchant available for one of said consumers;
- receiving from said processing institution via an interchange, an indication to grant a credit to said one of said consumers for said discount;
- granting said credit in favor of said one of said consumers for providing said discount.

74. In a system for providing targeted offers for discounts by merchants to consumers and including a processing institution for selecting said offers, a method comprising:
- providing first information respecting a first group, said first information provided by a first information provider, wherein said processing institution selects discounts for transactions that will be offered by selected merchants to selected consumers responsive to said first information and second information, second information provided by a second information provider; wherein said first information and said second information, taken together, comprise consumer targeting criteria, transaction requirement criteria, and previous transaction information for at least one of said selected consumers; and
- wherein a discount is returned to one of said selected consumers upon participating in one of said transactions with one of said merchants, by a payment system institution for said one of said consumers.

* * * * *